(12) United States Patent
Li et al.

(10) Patent No.: US 12,237,105 B2
(45) Date of Patent: Feb. 25, 2025

(54) ADDITIVE MANUFACTURING OF PERMANENT MAGNETS WITH POST PROCESSING

(71) Applicant: FORD GLOBAL TECHNOLOGIES, LLC, Dearborn, MI (US)

(72) Inventors: Wanfeng Li, Novi, MI (US); Michael W. Degner, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 530 days.

(21) Appl. No.: 17/547,809

(22) Filed: Dec. 10, 2021

(65) Prior Publication Data

US 2023/0187130 A1 Jun. 15, 2023

(51) Int. Cl.

| | |
|---|---|
| *H01F 41/02* | (2006.01) |
| *B29C 64/153* | (2017.01) |
| *B29C 64/393* | (2017.01) |
| *B33Y 50/02* | (2015.01) |
| *B33Y 70/00* | (2020.01) |
| *B33Y 80/00* | (2015.01) |
| *H01F 1/053* | (2006.01) |
| *H01F 1/10* | (2006.01) |

(52) U.S. Cl.
CPC ....... *H01F 41/0246* (2013.01); *B29C 64/153* (2017.08); *B29C 64/393* (2017.08); *B33Y 50/02* (2014.12); *B33Y 70/00* (2014.12); *B33Y 80/00* (2014.12); *H01F 1/053* (2013.01); *H01F 1/10* (2013.01); *H01F 41/0266* (2013.01)

(58) Field of Classification Search
CPC ............. H01F 41/0246; H01F 41/0253; H01F 41/0266; H01F 41/0273; H01F 41/12; H01F 41/122; H01F 41/127; H01F 41/34; B33Y 70/10; B29C 64/153
See application file for complete search history.

(56) References Cited

U.S. PATENT DOCUMENTS

| | | | |
|---|---|---|---|
| 2016/0115571 A1* | 4/2016 | Kestler | B23K 26/0006 |
| | | | 219/76.12 |
| 2017/0154713 A1* | 6/2017 | Simon | B23K 26/0006 |
| 2018/0122570 A1 | 5/2018 | Li et al. | |
| 2018/0215854 A1 | 8/2018 | Paranthaman et al. | |
| 2019/0052142 A1* | 2/2019 | Sullivan | H02K 3/38 |

(Continued)

FOREIGN PATENT DOCUMENTS

| | | |
|---|---|---|
| CN | 106971803 A | 7/2017 |
| CN | 107799251 A | 3/2018 |

(Continued)

OTHER PUBLICATIONS

JP-07242914-A english (Year: 1995).*

(Continued)

*Primary Examiner* — Ricardo D Morales
(74) *Attorney, Agent, or Firm* — David B Kelley; Brooks Kushman P.C.

(57) ABSTRACT

Permanent magnets and methods of making the same are disclosed herein. The permanent magnets include a 3D-printed, i.e., additively manufactured, framework and an infiltrate such that there is a discrete magnetic phase and a discrete non-magnetic phase or two discrete magnetic phases. The infiltrate may provide superior strength, elasticity or magnetic properties.

12 Claims, 3 Drawing Sheets

(56) References Cited

U.S. PATENT DOCUMENTS

2020/0094321 A1    3/2020  Li et al.
2021/0057149 A1    2/2021  Paranthaman et al.

FOREIGN PATENT DOCUMENTS

JP        07242914 A  *  9/1995
JP         6281986 B2    2/2018
WO      2013185967 A1   12/2013

OTHER PUBLICATIONS

Shrestha et al. ( "A Study of Pore Formation During Single Layer and Multiple Layer Build by Selective Laser Melting." Proceedings of the 30th Solid Freeform Fabrication Symposium. Vol. 30. 2019.). (Year: 2019).*

* cited by examiner

ADDITIVE MANUFACTURING OF PERMANENT MAGNETS WITH POST PROCESSING

TECHNICAL FIELD

The present disclosure relates to permanent magnets and method of making the same via additive manufacturing techniques.

BACKGROUND

Magnets pervade many technologies of modern life. Permanent magnets such as rare earth magnets (e.g., Nd—Fe—B) are widely used in electric machines and may be used in modern vehicles including electric vehicles and hybrid electric vehicles. For example, electric machines may include motors such as traction motors.

SUMMARY

A permanent magnet including a rare earth magnetic framework and an infiltrate disposed therein is disclosed. The framework is comprised of stratified layers and defines a venous system having a predetermined shape such that the infiltrate is disposed within the venous system.

A method of making a permanent magnet including forming a framework of a first composition, layer by layer, via additive manufacturing, disposing an infiltrate within the framework, and solidifying the infiltrate such that it forms a unitary body with the framework is disclosed. The framework provides a porous system of a predetermined shape that defines one or more pores. The infiltrate may be heated, melted, or sintered prior to, during, or after disposing it in the framework. The unitary body may maintain discrete phases of the framework and the infiltrate disposed within the one or more pores.

A permanent magnet including a first phase of stratified layers in a predetermined shape that defines a pathway system and a second phase disposed within the pathway system such that the first or second phase includes a magnetic phase is disclosed.

DETAILED DESCRIPTION

Figure 1A:
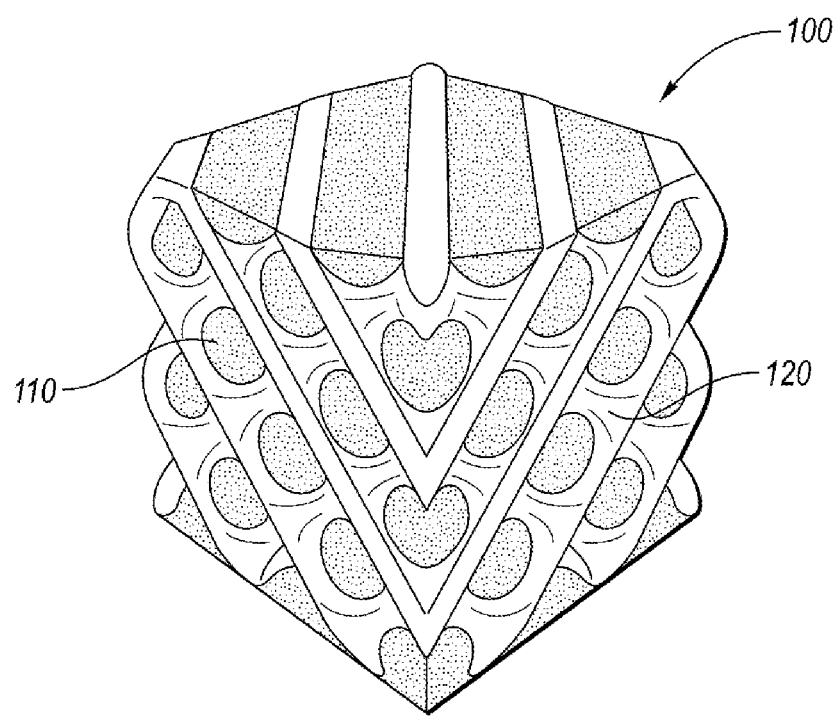
FIG. 1A is a perspective view of a permanent magnet.

Embodiments of the present disclosure are described herein. It is to be understood, however, that the disclosed embodiments are merely examples and other embodiments can take various and alternative forms. The figures are not necessarily to scale. Some features could be exaggerated or minimized to show details of particular components. Therefore, specific structural and functional details disclosed herein are not to be interpreted as limiting, but merely as a representative basis for teaching one skilled in the art to variously employ the embodiments of the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Unless expressly stated to the contrary, percent, "parts of," and ratio values are by weight. The first definition of an acronym or other abbreviation applies to all subsequent uses herein of the same abbreviation and applies mutatis mutandis to normal grammatical variations of the initially defined abbreviation. Unless expressly stated to the contrary, measurement of a property is determined by the same technique as previously or later referenced for the same property.

This disclosure is not limited to the specific embodiments and methods described below, as specific components and/or conditions may vary. Furthermore, the terminology used herein is used only for the purpose of describing particular embodiments and is not intended to be limiting in any way.

As used in the specification and the appended claims, the singular form "a," "an," and "the" comprise plural referents unless the context clearly indicates otherwise. For example, reference to a component in the singular is intended to comprise a plurality of components.

The term "substantially" or "generally" may be used herein to describe disclosed or claimed embodiments. The term "substantially" may modify a value or relative characteristic disclosed or claimed in the present disclosure. In such instances, "substantially" may signify that the value or relative characteristic it modifies is within ±0%, 0.1%, 0.5%, 1%, 2%, 3%, 4%, 5% or 10% of the value or relative characteristic.

It should also be appreciated that integer ranges explicitly include all intervening integers. For example, the integer range 1-10 explicitly includes 1, 2, 3, 4, 5, 6, 7, 8, 9, and 10. Similarly, the range 1 to 100 includes 1, 2, 3, 4 . . . 97, 98, 99, 100. Similarly, when any range is called for, intervening numbers that are increments of the difference between the upper limit and the lower limit divided by 10 can be taken as alternative upper or lower limits. For example, if the range is 1.1. to 2.1 the following numbers 1.2, 1.3, 1.4, 1.5, 1.6, 1.7, 1.8, 1.9, and 2.0 can be selected as lower or upper limits.

Figure 1B:
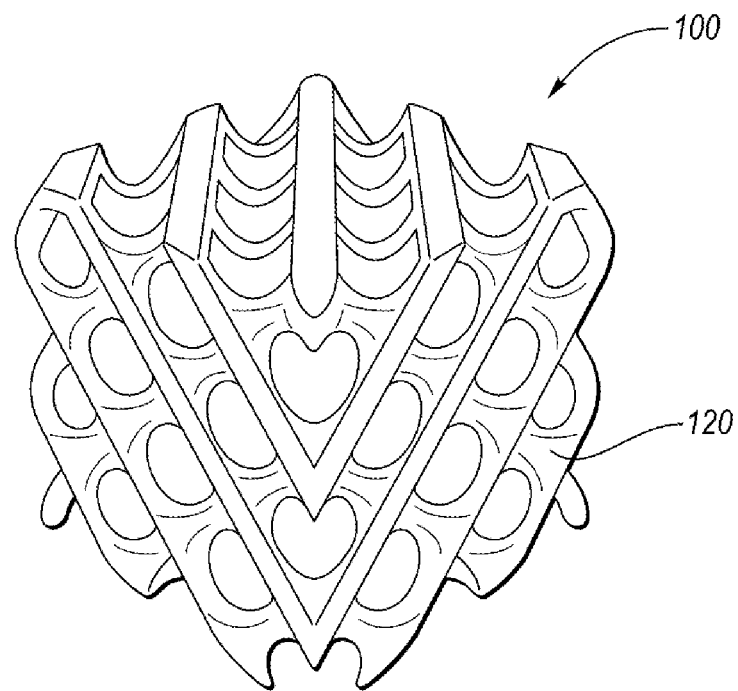
FIG. 1B is a perspective view of a framework.
Figure 2:
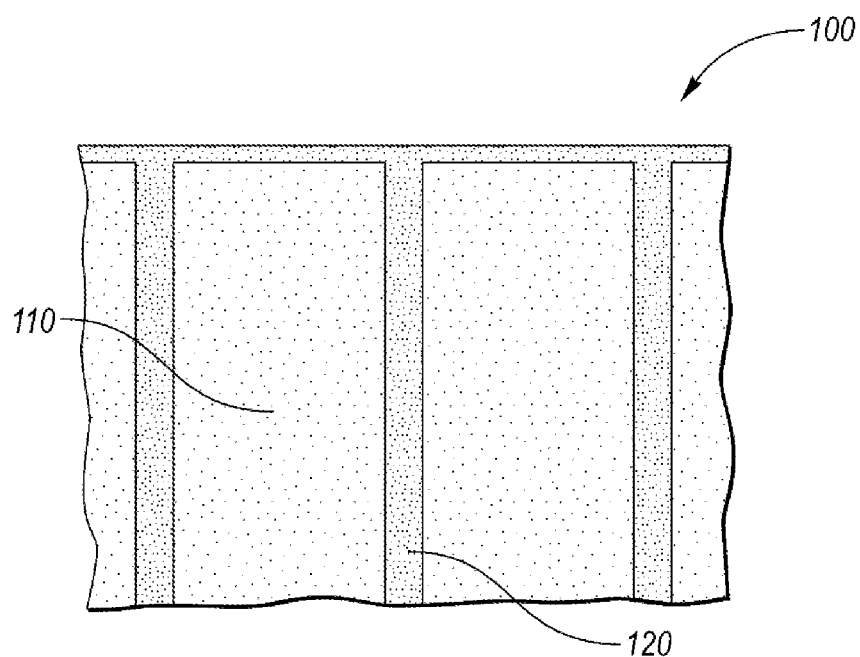
FIG. 2 is a zoomed-in view of a permanent magnet.
Figure 3:
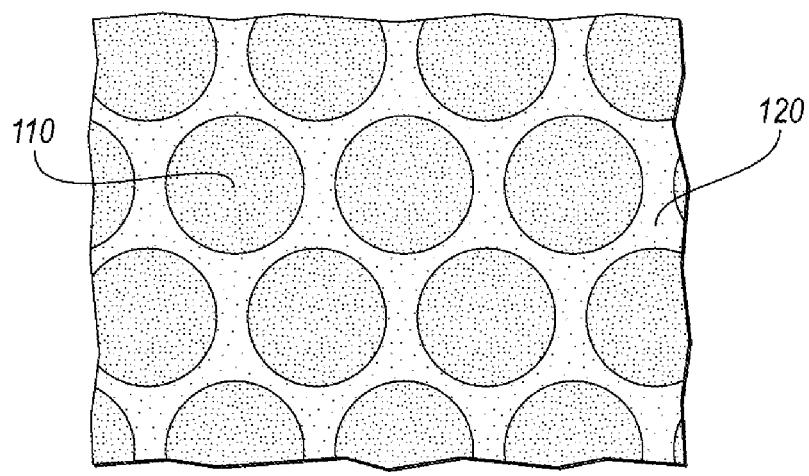
FIG. 3 is a zoomed-in view of another permanent magnet.

A permanent magnet 100 is disclosed, as shown in FIG. 1A. The permanent magnet 100 includes a framework 110, shown in FIG. 1B, defining one or more gaps, holes, orifices, pores, and/or channels and an infiltrate 120 disposed in the framework 110 as shown in FIG. 2. The framework 110 is additively manufactured and thus has a venous, porous or pathway system of a predetermined shape, architecture, configuration, or pattern, unlike conventional magnets, which have a random pathway along the grain boundaries. The framework 110 also includes stratified layers via the additive manufacturing process. The permanent magnet 100 may have a magnetic phase and a non-magnetic phase. For example, the framework 110 may be a magnetic phase such as a rare earth alloy (e.g., Nd—Fe—B) and the infiltrate 120 may be a non-magnetic phase that mitigates defects or augments desirable properties of the magnetic phase or vice versa, as shown in FIG. 2. In yet another variation, the permanent magnetic 100 may include a plurality of magnetic phases. For example, the framework 110 may be a first rare earth alloy (e.g., Nd—Fe—B) and the infiltrate may be non-rare earth alloy or a second rare earth alloy (e.g., Mn—Bi, Mn—Al, Nd—Zn, Nd—Pr). In still another embodiment, the framework may be a nonmagnetic phase and the infiltrate may be a magnetic phase as shown in FIG. 3.

The framework 110 may be of various shapes and sizes based on its purpose. In some variations, the framework 110 may be of a shape that defines one or more channels. In other variations, the framework 110 may be of a shape that creates a porous microstructure. The gaps, pores, or channels may be of any suitable shape and size. The pores may be of a shape a size such that the infiltrate may flow or be injected into the open spaces of the framework 110. For example, the pores may be round, rectangular, triangular, or polygonal. In a refinement, a width of the pores or channels may be of a nanoscale, microscale, or macroscale. For example, the width may be 0.5 to 200 µm, or more preferably 2 to 50 µm, or even more preferably 5 to 10. In another refinement, the width may be 0.2 to 5 mm, or more preferably 0.5 to 2 mm, or even more preferably 0.5 to 1 mm. Larger pores such as micro or macro-sized pores may make it easier to fill or inject the infiltrate through the porous pathways. Micro or macro-sized pores may also offer unique benefits and advantages not seen in conventional magnets with infiltrates that diffuse along the grain boundary which has nanoscale dimensions. In one or more embodiments, the framework may be made of a magnetic phase such as a rare earth alloy such as Nd—Fe—B or SmCo. Alternatively, the framework may be made of a non-magnetic material such as a material that is less brittle than a magnetic phase of the magnet. Still further the infiltration process may be much faster, more controlled, and more efficient than infiltrates diffused via the grain boundary. For example, infiltrates that solely rely on the grain boundary for infiltration action may not actually make it to the core or center of the magnetic body. However, additively manufactured frameworks may provide direct and unhindered paths to the center or core of the magnetic body. Controlling the diffusion of an infiltrate through the grain boundary is much less controllable compared with the predetermined and engineered paths of printed frameworks.

The infiltrate 120 may mitigate, eliminate, or augment properties of another phase. The infiltrate 120 may insulate thermally sensitive magnetic phases such as Nd—Fe—B (i.e., insulating infiltrate), reduce eddy current losses, enhance mechanical properties, and/or modify electric or magnetic phases. For example, if the framework 110 is a brittle magnetic phase such as Nd—Fe—B, a less brittle or high strength infiltrate 120 may be used to provide superior overall mechanical properties. Suitable infiltrates 120 may, for instance, be an epoxy, Cu—P, Al—Si(Ge), Al—Si(Ge)—Fe(Co,Cr), or low melting point glasses. In yet another embodiment, the infiltrate may be a magnetic material such as MnBi. In a refinement, an infiltrate having a melting point of less than 1000° C., or more preferably less than 900° C., or even more preferably less than 800° C. may be used. For example, an epoxy may assist in reducing eddy current losses because it has low electrical conductivity to minimize electrical currents and high thermal conductivity for distributing any heat that is generated. In some embodiments, the aluminum silica alloys may be more suitable because of their superior mechanical properties such as tensile strength.

Figure 4A:
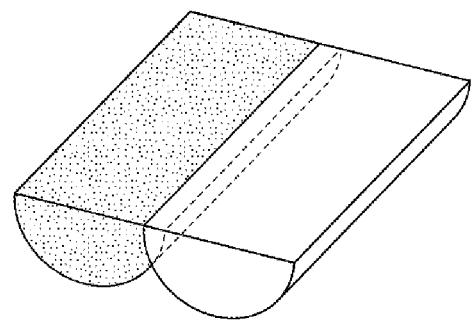
FIG. 4A-4C are schematics illustrating different laser hatch-patterns that may be used when making a framework.
Figure 4B:
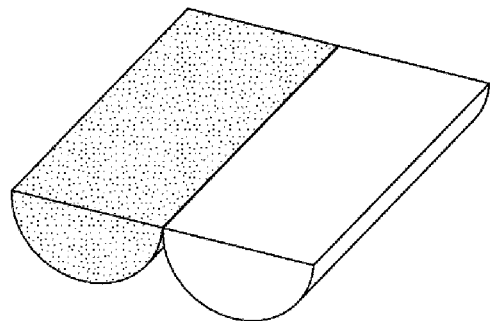
Figure 4C:
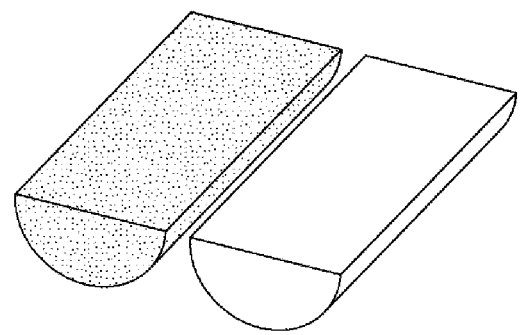
Figure 5:
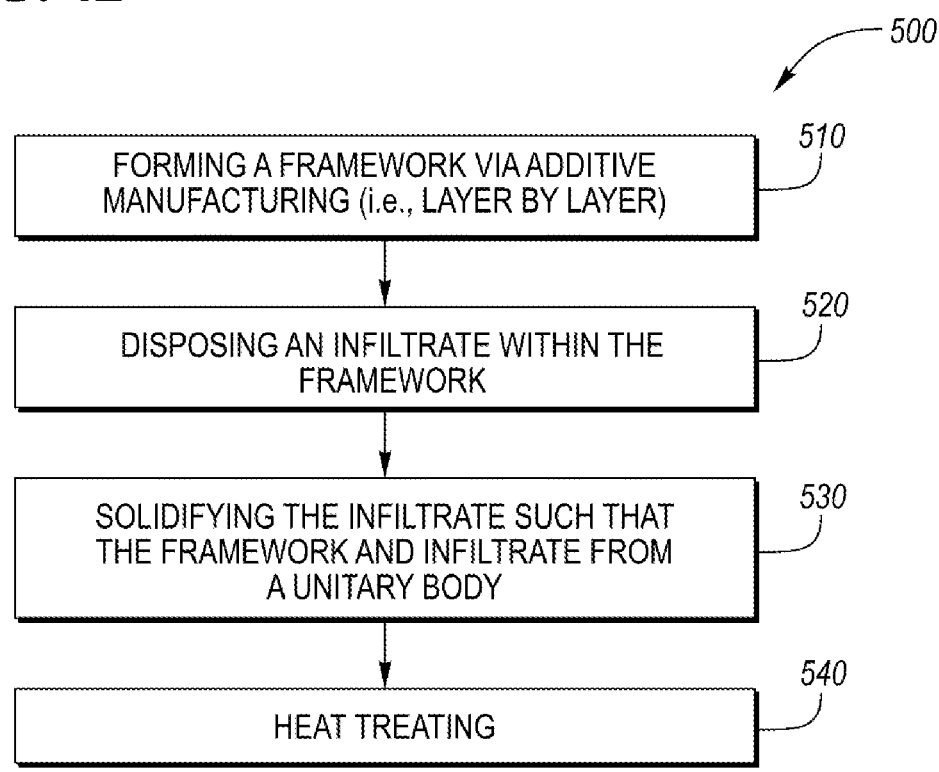
FIG. 5 is a flow chart illustrating a method of making a magnet.

The framework 110 is additively manufactured such as by laser melting. For example, laser melting may include selective laser melting, direct laser melting, direct metal laser melting, or powder bed fusion. Additively manufacturing magnets using a framework 110 and infiltrate may provide various benefits and allow a magnet to be made and optimized for its intended purpose. For example, various combination of a magnetic phase and infiltrate 120 may be combined with various shapes and configurations that minimize or eliminate defects (e.g., brittleness and cracking). Additive manufacturing can add thermal stresses not normally experienced because the use of an intense and focused heat source such as a laser, which results in thermal gradients, high heating rates, and high cooling rates. The infiltrate 120 can reduce or counter the stresses incurred on the printed (i.e., additively manufactured) framework 110. Controlling scanning parameters such as laser intensity/power and patterning can be used to create frameworks having open spaces (e.g., pores) therebetween. For instance, using laser hatch patterns (e.g., hatch spacing) and/or modifying the laser intensity/power may increase or decrease porosity and the open volume for an infiltrate as shown in FIG. 4A-4C. For example, FIG. 4A shows a hatch pattern with some overlap and FIG. 4C shows a gap between laser hatch patterns. In some variations, the framework to open space/infiltrate may have a volume ratio of 5 to 1, or more preferably 10 to 1, or even more preferably 20 to 1. Said differently, the framework 110 may have a porosity of 40% to 60%, more preferably 45% to 55%, or even more preferably 48% to 52%. In at least one variation, the shape of the framework 110 and infiltrate 120 may be configured to reduce resistivity along a first direction. In one or more embodiments, the shape of the framework 110 may be such that the infiltrate is uniform along the entire shape of the magnet. In another embodiment, the shape of the framework 110 may be such that the infiltrate is non-uniformly distributed. For example, in a refinement, the shape of the framework and more particularly the open space created therebetween may provide for greater concentrations of infiltrate at the corner, edges, and/or center.

A method of making a magnet is disclosed. The method may include additively manufacturing a framework, layer by layer, such that it has gaps, pores, or channels throughout (i.e., step 510). The gaps, pores, and/or channels may be evenly or uniformly distributed through the shape of the framework. Alternatively, the gaps, pores, or channels may be unevenly distributed such that there is a greater volume of empty space at the corners, edges, and/or core. The framework may be made by laser melting. For example, a magnetic, metallic, and/or alloy powder may be provided at a predetermined thickness and then a laser may be used to melt and cool/sinter the powder to form a shape. Another powder layer may then be applied on top of the shape at a predetermined thickness and a laser may be used to melt and cool/sinter the powder to build an additional layer on the shape. This process may be repeated until a framework having a venous, porous, or pathway system of a predetermined shape is defined by the framework. The veins, pores, or pathway system may have a predetermined pattern. An infiltrate may then be disposed within the gaps, pores, and/or channels of the system (i.e., step 520). In one variation, a flowable material may be injected (e.g., pressurized) into the gaps, pores and/or channels. In another variation, the flowable infiltrate material may be diffused into the gaps, pores, and/or channels via gravity and/or capillary effects. For example, the framework may be filled via pouring or dipped into a flowable infiltrate pool. The flowable infiltrate may be a solid powder, a melted metallic or alloy material, or an unreacted or partially unreacted polymeric material such as an epoxy. Once the flowable infiltrate material is disposed in the gaps, pores, and/or channels, it may be solidified (i.e., step 530). For example, a melted alloy or magnetic material may be cooled. A powder may be melted and then cooled or sintered. A flowable polymeric material may be reacted via introduction of a reactant portion, initiator, or heat. Once the infiltrate is solidified within the gaps, pores, and/or channels it may form a unitary body with the framework. After any step or after every step the materials may be heat-treated (i.e., step 540) to remove thermal stresses or provide more desirable (e.g., stronger) crystalline or amorphous structures.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to strength, durability, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A method of making a permanent magnet comprising:
additively manufacturing a framework of a first composition layer by layer, the framework having a pathway system of predetermined shape and defining one or more pores;
disposing an infiltrate, including MnBi, Al—Si(Ge), or Al—Si(Ge)—Fe(Co,Cr), within the pathway system;
sintering or melting the infiltrate; and
solidifying the infiltrate such that it is disposed within the pathway system, and that the framework and infiltrate form a body having discrete phases.

2. The method of claim 1, where the additively manufacturing is laser melting.

3. The method of claim 2, wherein the first composition is Nd—Fe—B.

4. The method of claim 3, wherein the infiltrate includes MnBi.

5. The method of claim 1, wherein the framework defining the pathway system is formed by varying hatch spacing.

6. The method of claim 2, wherein the framework defining the pathway system is formed by varying laser power.

7. The method of claim 1, wherein the pathway system is a venous pathway system.

8. The method of claim 3, wherein the infiltrate includes Al—Si(Ge).

9. The method of claim 3, wherein the infiltrate includes Al—Si(Ge)—Fe(Co,Cr).

10. The method of claim 1, wherein the infiltrate includes MnBi.

11. The method of claim 1, wherein the infiltrate includes Al—Si(Ge).

12. The method of claim 1, wherein the infiltrate includes Al—Si(Ge)—Fe(Co,Cr).

* * * * *